(12) United States Patent
Sjöland et al.

(10) Patent No.: US 9,647,752 B2
(45) Date of Patent: May 9, 2017

(54) ANTENNA SWITCH CONTROL METHOD FOR ANALOG RADIO OVER FIBER SYSTEMS

(71) Applicant: Telefonaktiebolaget L M Ericsson (publ), Stockholm (SE)

(72) Inventors: Henrik Sjöland, Lund (SE); Waqas Ahmad, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/881,212

(22) Filed: Oct. 13, 2015

(65) Prior Publication Data

US 2017/0104524 A1    Apr. 13, 2017

(51) Int. Cl.
*H04B 10/079* (2013.01)
*H04B 10/2575* (2013.01)

(52) U.S. Cl.
CPC ..... *H04B 10/079* (2013.01); *H04B 10/07953* (2013.01); *H04B 10/25758* (2013.01)

(58) Field of Classification Search
CPC ............ H04B 10/079; H04B 10/25758; H04B 10/07953
See application file for complete search history.

(56) References Cited

U.S. PATENT DOCUMENTS

| 6,122,083 | A | 9/2000 | Ohta et al. | |
| 2003/0228151 | A1* | 12/2003 | Niiho | H04B 10/25758 398/115 |
| 2006/0063494 | A1 | 3/2006 | Zhang et al. | |
| 2007/0092262 | A1* | 4/2007 | Bozarth | H04B 10/505 398/159 |
| 2007/0237181 | A1 | 10/2007 | Cho et al. | |
| 2008/0056167 | A1 | 3/2008 | Kim et al. | |
| 2008/0145061 | A1 | 6/2008 | Lee et al. | |
| 2008/0260388 | A1 | 10/2008 | Kim et al. | |
| 2016/0182120 | A1* | 6/2016 | Maimon | H04B 1/0458 455/78 |

FOREIGN PATENT DOCUMENTS

EP    1372274 A2    12/2003
JP    2004241909 A    8/2004

* cited by examiner

*Primary Examiner* — Leslie Pascal
(74) *Attorney, Agent, or Firm* — Coats & Bennett, PLLC

(57) ABSTRACT

A central node connected to a remote network node via a fiber optic link controls an antenna switch in the remote network node by controlling the DC bias current of the laser providing an optical transmission signal from the central network node to the remote network node via the fiber optic link. The remote network node converts the received optical transmission signal to an electrical transmission signal, and detects the DC level of the electrical transmission signal. If the detected DC level satisfies a predetermined condition, the remote network node connects the antenna port of the antenna switch, and thus the antenna, to a reception signal path of the remote network node. Otherwise, the remote network node connects the antenna port of the antenna switch, and thus the antenna, to a transmission signal path of the remote network node.

15 Claims, 7 Drawing Sheets

ANTENNA SWITCH CONTROL METHOD FOR ANALOG RADIO OVER FIBER SYSTEMS

BACKGROUND

In a wireless communication network, a fixed wireless network node communicates with one or more remote wireless devices via a wireless channel. Such a wireless network node is typically referred to as, e.g., a base station, a radio base station, a NodeB, an enhanced NodeB (eNodeB), etc. For simplicity, the following refers to such a wireless network node as a "base station" or a "BS."

A central node controls the operations of each BS connected to it, as well as the communications to and from each BS. In some cases, the central node connects to each BS via one or more optical fibers. For frequency division duplexing (FDD) systems, where transmission and reception happen at the same time, each BS includes a duplexer to isolate the reception and transmission chains. For time division duplexing (TDD) systems, where transmission and reception happen at different times, each BS typically includes a circulator to isolate the transmission and reception chains. Circulators, however, tend to be bulky and expensive. Further, circulators prevent the corresponding BS from being able to deactivate the transmission/reception chain when the BS is receiving/transmitting signals. Thus, there remains a need to improve the performance associated with the optical fiber connection between the central node and the BSs.

SUMMARY

The solution presented herein adjusts the DC bias current of the laser providing an optical transmission signal from a central network node to a remote network node via a fiber optic link to control whether the remote network node should execute transmission or reception operations. The remote network node subsequently controls an antenna switch to connect the antenna to a transmission signal path or a reception signal path depending on the DC bias current output by the corresponding photodetector in the remote network node.

In one exemplary embodiment, a first network node is operatively connected to a second network node via at least one optical fiber. The first network node is configured to wirelessly communicate with one or more wireless terminals via an antenna, and comprises a fiber input, a fiber output, a detection circuit, and an antenna switch comprising an antenna port, transmission port, and reception port. The antenna switch is configured to selectively connect the antenna port to either the transmission port or the reception port. The transmission port operatively connects to the fiber input via a transmission circuit path, the reception port operatively connects to the fiber output via a reception circuit path, and the antenna port operatively connects to the antenna. The detection circuit is configured to detect a direct current (DC) level of a transmission signal output by the fiber input. When the detected DC level satisfies a predetermined condition, e.g., the detected DC level is less than a reference level, the detection circuit controls the antenna switch to connect the antenna port to the reception port. Otherwise, the detection circuit controls the antenna switch to connect the antenna port to the transmission port to transmit the transmission signal via the antenna.

Another exemplary embodiment includes a method of controlling an antenna switch in a first network node operatively connected to a second network node via at least one optical fiber. The first network node is configured to wirelessly communicate with one or more wireless terminals via an antenna. The method comprises receiving an optical transmission signal from the second network node at a fiber input of the first network node, converting the received optical transmission signal into an electrical transmission signal, and detecting a direct current (DC) level of the electrical transmission signal. The method further comprises selectively connecting an antenna port of the antenna switch to a reception port of the antenna switch when the detected DC level satisfies a predetermined condition. The reception port operatively connects to a fiber output of the first network node via a reception circuit path, and the antenna port operatively connects to the antenna. Otherwise, the method includes selectively connecting the antenna port to a transmission port of the antenna switch to transmit a radio frequency (RF) version of the electrical transmission signal via the antenna. The transmission port operatively connects to a fiber input of the first network node via a transmission circuit path.

In another exemplary embodiment, a computer program product stored in a non-transitory computer readable medium controls a processing circuit in a first network node. The first network node operatively connects to a second network node via at least one optical fiber. The first network node is configured to wirelessly communicate with one or more wireless terminals via an antenna. The computer program product comprises software instructions which, when run on the processing circuit, causes the processing circuit to receive an optical transmission signal from the second network node at a fiber input of the first network node, convert the optical transmission signal into an electrical transmission signal, and detect a direct current (DC) level of the electrical transmission signal. The software instructions further cause the processing circuit to selectively connect an antenna port of an antenna switch to a reception port of the antenna switch when the detected DC level satisfies a predetermined condition. The reception port operatively connects to a fiber output of the first network node via a reception circuit path, and the antenna port operatively connecting to the antenna. Otherwise, the software instructions cause the processing circuit to selectively connect the antenna port to a transmission port of the antenna switch to transmit a radio frequency version of the electrical transmission signal via the antenna. The transmission port operatively connects to the fiber input of the first network node via a transmission circuit path.

DETAILED DESCRIPTION

As noted above, a central node controls the operations of each BS connected to the central node, as well as the communications to and from each BS, where the central node connects to each BS via one or more optical fibers. To reduce and/or eliminate the problems associated with circulators, a BS may use a switch to isolate the transmission and reception chains. Not only are switches smaller and cheaper, but they also enable the BS to power down at least some of the components in the chain not currently being used by the BS. However, such switches (and any associated power saving actions) should be controlled by the central node, e.g., via a control signal provided by the central node to the BS. Currently, in analog radio over fiber systems, no control signal is available to perform such a task. Thus, using a switch adds a layer of complexity not typically present with circulators.

One solution involves using a dedicated fiber to provide the control signal to the BS. Such a solution requires at least one extra laser at the central node and at least one extra photodetector at the BS. Thus, this solution requires extra hardware in the central node and the BS, which increases the cost, size, and complexity of both the central node and the BS.

Another solution involves using wavelength division multiplexing (WDM), where the central node transmits the control signal using the same optical fiber used to transmit the optical transmission signals to the BS, but on a different wavelength. This solution does not require an extra fiber, but still requires at least one extra laser at the central node and at least one extra photodetector at the BS. In addition, this solution requires an optical multiplexer at the central node to multiplex the control signal and the optical transmission signal(s) onto the same optical fiber, and an optical demultiplexer at the BS to demultiplex the received signal into the separate control signal and transmission signal(s). Thus, this solution also requires extra hardware in the central node and BS, which increases the size and cost of both the central node and the BS.

Figure 1:
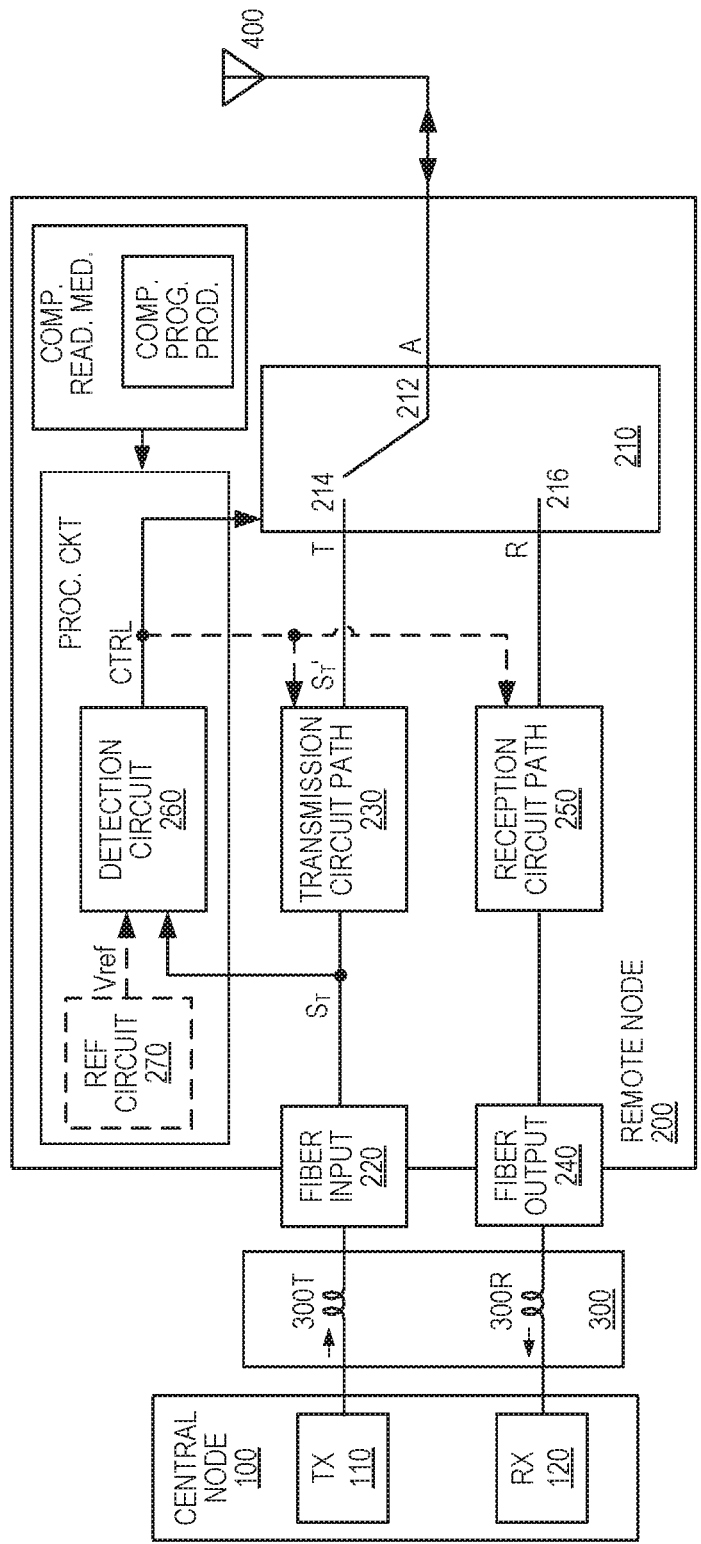
FIG. 1 shows a block diagram of an exemplary wireless communication network.

FIG. 1 shows wireless network 10 that employs a switch solution with reduced cost, size, and complexity relative to other switch solutions. The wireless network 10 includes a central node 100 optically coupled to a BS 200 via at least one optical fiber 300. According to the solution presented herein, the central node 100 provides the control signal to the base station 200 with the optical transmission signal by controlling the DC bias current of the transmission laser 110 in the central node 100. The BS 200 subsequently detects the DC level of an electrical transmission signal generated from the received optical transmission signal, and controls a switch 210 responsive to the detected DC level. While FIG. 1 shows a transmission fiber 300T separate from a reception fiber 300R, it will be appreciated that a single optical fiber 300 may be used to convey the optical transmission and reception signals between the central node 100 and the BS 200.

More particularly, the central node 100 includes a transmitter 110 and a receiver 120. The transmitter 110 generates an optical transmission signal, e.g., using a laser, responsive to an input signal (not shown) for transmission to the BS 200 via optical fiber 300T according to any known means. The receiver 120 converts an optical reception signal received from the BS 200 via optical fiber 300R to an output signal, e.g., using a photodetector (not shown), according to any known means. To produce the desired linearity performance in the transmitter 110, the central node 100 biases the transmitter 110 at an optimum DC current. When the BS 200 is processing reception signals received by antenna 400, however, the central node 100 biases the transmitter 110 to a different bias value than used to optimize the transmitter 110. This different bias value enables the BS 200 to control the switch appropriately, as discussed further below.

Figure 4B:
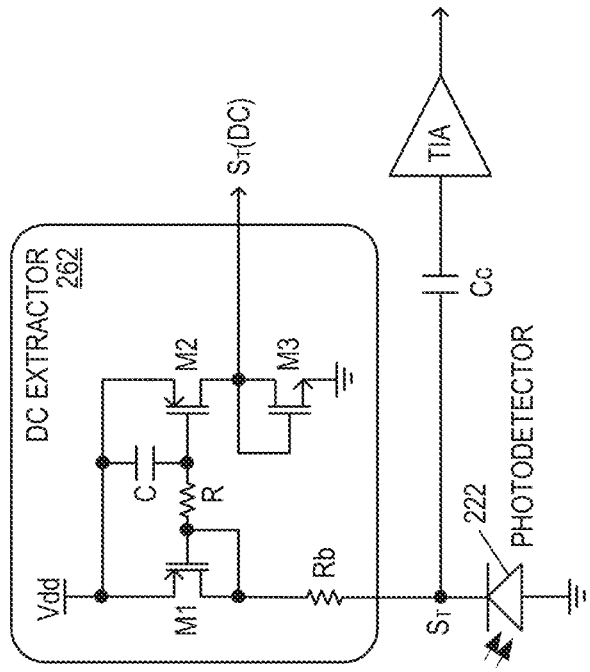
FIGS. 4A and 4B show a circuit diagram of DC extraction circuits according to exemplary embodiments.
Figure 4A:
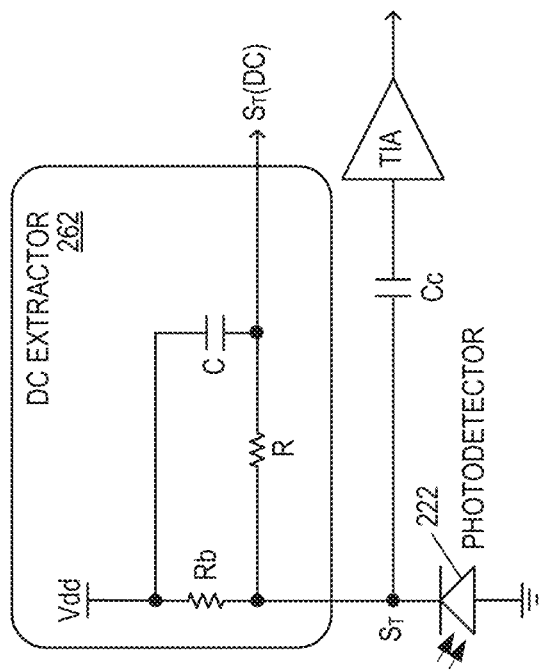

BS 200 comprises switch 210, fiber input 220, transmission circuit path 230, fiber output 240, reception circuit path 250, and detection circuit 260. Switch 210 includes an antenna port 212 operatively coupled to antenna 400, a transmission port 214 operatively connecting the fiber input 220 to switch 210 via the transmission circuit path 230, and a reception port 216 operatively connecting the fiber output 240 to switch 210 via the reception circuit path 250. Fiber input 220 converts the optical transmission signal provided by the central node 100 via the optical fiber 300T to an electrical transmission signal $S_T$, e.g., using a photodetector 222 (FIGS. 4A and 4B). It will be appreciated that the electrical transmission signal $S_T$ represents a received transmission signal, and thus may also be referred to as a received transmission signal $S_T$. Fiber output 240 converts the electrical reception signal to an optical reception signal, e.g., using a laser, and provides the optical reception signal to the central node 100 via optical fiber 300R. Transmission circuit path 230 includes one or more circuit components, e.g., one or more filters, one or more amplifiers, mixers, etc., configured to process $S_T$ to generate a radio frequency (RF) transmission signal $S'_T$ suitable for transmission via the antenna 400. It will be appreciated that the in some cases the transmission circuit path 230 does not include a mixer because the optical transmission signal, and thus the electrical transmission signal at the input to the transmission circuit path 230, is already at the desired radio frequency. In other cases, however, the transmission circuit path 230 will include some type of mixer circuitry to up convert the input electrical transmission signal so that $S'_T$ is at the desired radio frequency. Reception circuit path 250 includes one or more circuit components, e.g., one or more amplifiers, one or more filters, laser driver, downconverter, etc., configured to process the signal received by antenna 400 to generate a reception signal suitable for fiber output 240. It will be appreciated that the reception signal output by the reception circuit path 250 may still be at the same radio frequency as the signal received by the antenna 400, or it may have been downcoverted to some intermediate or low frequency by the reception circuit path 250. Detection circuit 260 detects the DC level of $S_T$, and controls the switch to connect the antenna port 212 to either the transmission port 214 or the reception port 216 responsive to the detected DC level.

Figure 2:
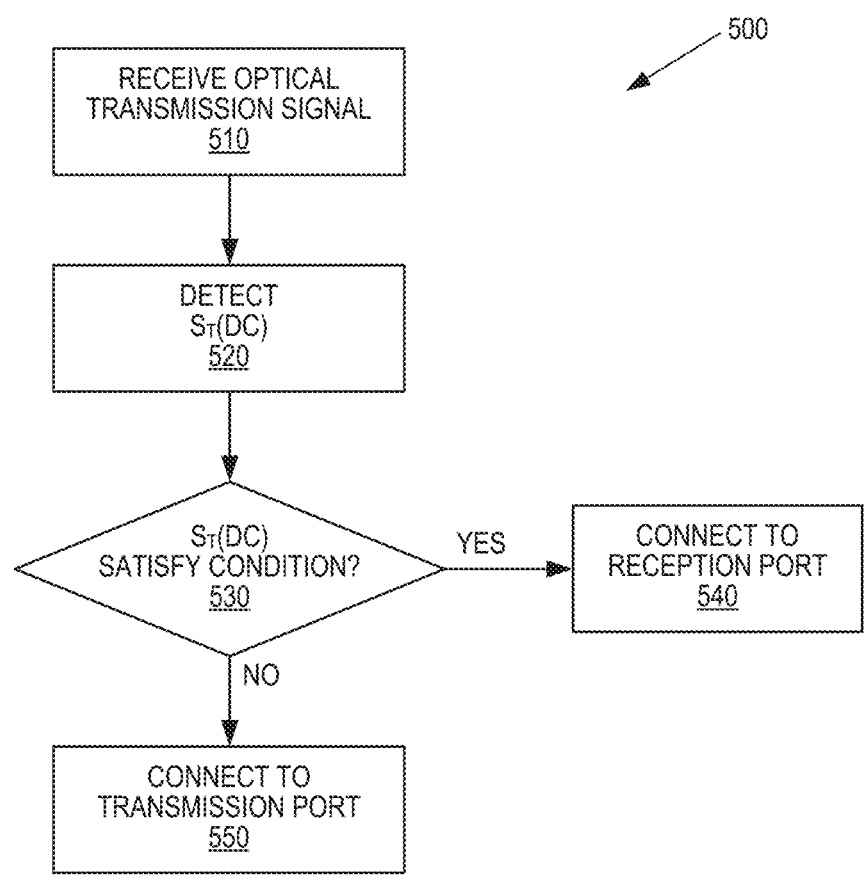
FIG. 2 shows a block diagram of a method according to one exemplary embodiment.

FIG. 2 shows an exemplary method 500 implemented by the BS 200 of controlling switch 210 according to one exemplary embodiment. The fiber input 220 receives an optical transmission signal from the central node 100 (block 510), and converts the received optical transmission signal into an electrical transmission signal $S_T$. Detection circuit 260 detects the DC level $S_T$ (DC) of the received transmission signal $S_T$ (block 520). If $S_T$ (DC) satisfies a predetermined condition (block 530), the detection circuit 260 generates a control signal CTRL to control the switch 210 to connect the antenna port 212 to the reception port 216 (block 540). Otherwise, if the detected DC level does not satisfy the predetermined condition (block 530), the detection circuit 260 generates a control signal CTRL to control the switch 210 to connect the antenna port 212 to the transmission port 214 (block 550). As a result, the solution presented herein controls switch 210 without requiring additional lasers, photodetectors, or multiplexers.

Figure 3:
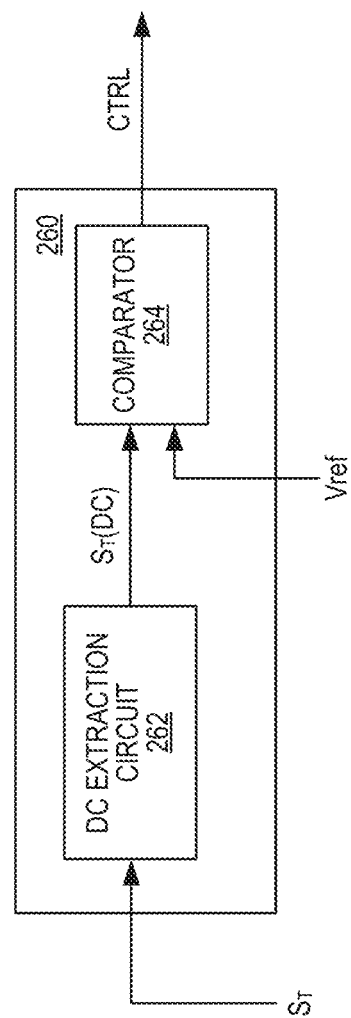
FIG. 3 shows a block diagram of a detection circuit according to one exemplary embodiment.

As noted above, detection circuit 260 controls the antenna switch 210 responsive to the detected DC level of $S_T$. To that end, one exemplary detection circuit 260 comprises a DC extraction circuit 262 and a comparator 264, as shown in FIG. 3. DC extraction circuit 262 extracts the DC level from $S_T$ using any known means. Comparator 264 generates the control signal CTRL based on a comparison between the detected DC level $S_T$ (DC) and a reference level $V_{ref}$. When the comparison satisfies a predetermined condition relative to the reference level, the resulting control signal CTRL controls the switch 210 to connect the antenna port 212 to the reception port 216.

In one exemplary embodiment, the predetermined condition is based on whether the detected DC level $S_T$ (DC) is sufficiently less than the optimal DC level for transmitter 110. In this case, comparator 264 controls switch 210 to connect the antenna port 212 to the reception port 216 when the detected DC level is less than the reference level, where the reference level is a value less than the optimal DC level for the transmitter 110, and where the difference in the reference level and the optimal DC level accounts for, e.g., the RF level of $S_T$, as discussed further below. In this case, central node 100 controls BS 200 to connect antenna 400 to the reception circuit path 250 by setting the DC level to a value less than the reference level.

In another exemplary embodiment, the predetermined condition is based on whether the detected DC level sufficiently exceeds the optimal DC level set for the transmitter 110. In this case, comparator 264 controls the switch 210 to connect the antenna port 212 to the reception port 216 when the detected DC level meets or exceeds the reference level, where the reference level is a value greater than the optimal DC level for the transmitter 110. In this case, central node 100 controls the BS 200 to connect antenna 400 to the reception circuit path 250 by setting the DC level to a value greater than the reference level. This embodiment may, e.g., be useful if the polarity of the electrical transmission signal is reversed before the detection circuit 260 extracts the DC level.

The DC extraction circuit 262 may comprise any circuit capable of extracting the DC level from $S_T$. FIGS. 4A and 4B show exemplary extraction circuits 262 that comprise a low-pass filter that separates the DC level $S_T$ (DC) from the radio frequency (RF) signal in $S_T$. In these figures, the TIA represents an amplifier that may be part of the transmission circuit path 230. In this embodiment, the cut-off frequency of the low-pass filter is chosen depending on the operating frequency of BS 200. FIG. 4A shows the simplest implementation, where the low-pass filter comprises a resistor-capacitor (RC) low-pass filter. In this implementation, resistor $R_b$ biases the photodetector 222 of the fiber input 220, and capacitor $C_c$ operates as a DC block. The DC level $S_T$ (DC) output by the low-pass filter of FIG. 4A is also the reverse bias voltage across the photodetector 222. The low-pass filter circuit of FIG. 4B may be used to decouple the reverse bias voltage of the photodetector 222 from the low-pass filter output $S_T$ (DC). In this case, the suitable level of $S_T$ (DC) may be chosen by sizing the transistors M2 and M3 accordingly.

Figure 5:
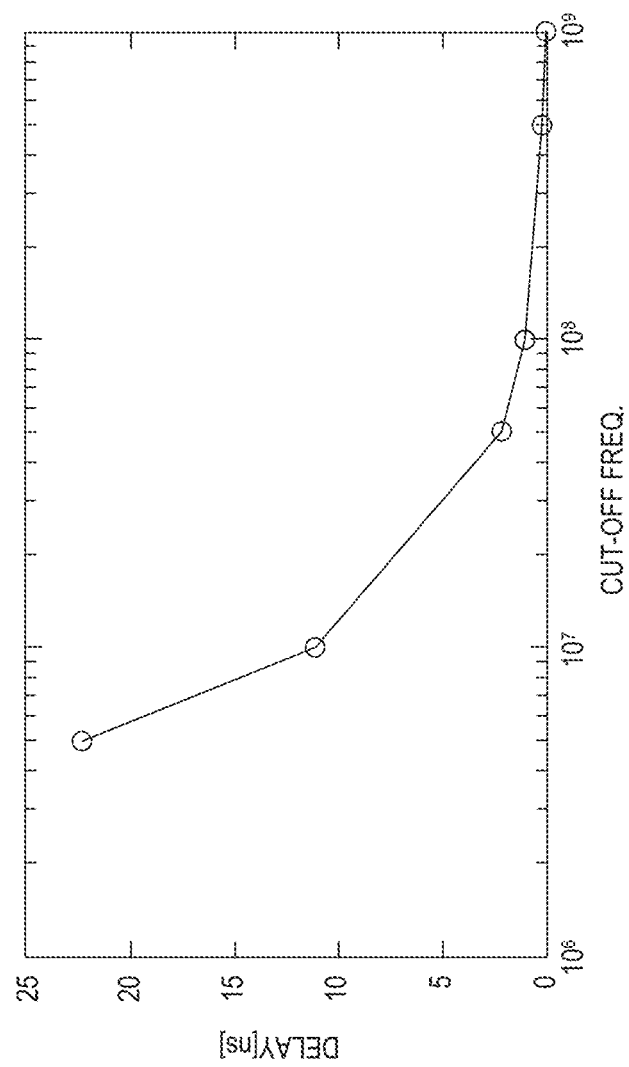
FIG. 5 shows simulated delays of a filter of the detection circuit of FIG. 3.

The cut-off frequency of the low pass filter not only determines the frequencies that are blocked by the low-pass filter, but also determines the time it takes to generate the control signal after the optical transmission signal is detected by the photodetector 222. This delay determines the time that the transmitter 110 in the central node 100 has to wait after changing the laser bias current before data for transmission may actually be provided to the remote node 200. The time required to generate the control signal is determined by the time constant ($\tau = R_t C$), where $R_t$ and $C$ represent the total resistance and capacitance, respectively of the extraction circuit 262. Assuming, the reference level is chosen appropriately and ignoring the delay introduced by the comparator 264, the time required to generate the control signal is 0.7*$\tau$, which generally represents the amount of time needed for the low pass filter to change at least 50% towards its final value. FIG. 5 shows simulated values of delay versus different cut-off frequencies of the low-pass filter.

The DC level $S_T$ (DC) of the electrical transmission signal used to control switch 210, and thus any corresponding reference level $V_{ref}$, should be selected carefully by keeping in mind the highest magnitude of the RF signal. If the difference between the optimal DC level selected for the transmitter 110 and the DC level selected to indicate reception operations is not large enough, a strong RF transmission signal may falsely trigger the detection circuit 260, causing switch 210 to incorrectly connect the antenna port 212 to the transmission port 214. Thus, the maximum amplitude of the RF transmission signal $I_{RF}$(max) and/or the effective impedance $Z_{eff}$ of the transmission circuit path 230 should be considered when selecting DC level used to indicate reception operations. In one exemplary embodiment, the minimum delta voltage $\Delta$(min)V between the optimal DC level for the transmitter 110 and the reference DC level $V_{ref}$ used to indicate reception operations may be given by:

$$\Delta(\min) > I_{RF}(\max)[Z_{eff}//Z_{ext}]A_{filter}, \quad (1)$$

where $I_{RF}$(max) represents the maximum amplitude of the RF transmission signal, $Z_{eff}$ represents the effective RF input impedance of the transmission circuit path 230 (e.g., the impedance of the amplifier), $Z_{ext}$ represents the RF input impedance of the DC extraction circuit 262, and $A_{filter}$ represents the voltage gain of the DC extraction circuit 262 at RF. In some embodiments, the offset errors in the circuitry and the laser, e.g., those caused by process variations, voltage variations, temperature variations, and/or random mismatches in fabrication, must also be considered. In this case, the minimum delta $\Delta$(min) between the optimal DC level for the transmitter 110 and the reference DC level $V_{ref}$ used to indicate reception operations may be given by:

$$\Delta(\min) > V_{os} + I_{RF}(\max)[Z_{eff}//Z_{ext}]A_{filter}, \quad (2)$$

where $V_{os}$ represents the comparator offset voltage.

While not required, the detection circuit 260 may also control one or more circuit components of the transmission circuit path 230 or the reception circuit path 250 depending on whether the DC level satisfies the predetermined condition. For example, if the detected DC level satisfies the predetermined condition, the control signal may also deactivate one or more circuit components of the transmission circuit path, e.g., TIA of FIGS. 4A and 4B, to save power since only the reception circuit path 250 is needed. Alternatively, if the detected DC level does not satisfy the predetermined condition, the control signal may also deactivate one or more circuit components of the reception circuit path 250 to save power since only the transmission circuit path 230 is needed.

Figure 6:
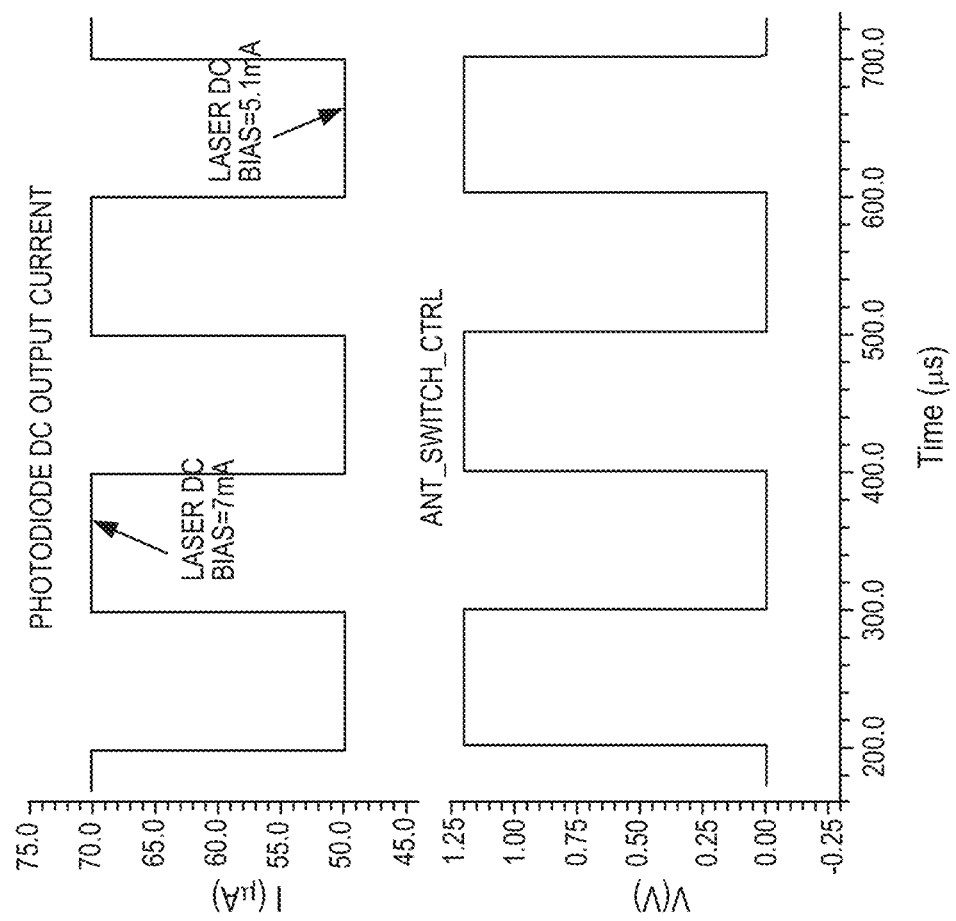
FIG. 6 shows simulation results for an exemplary implementation of the solution presented herein.
Figure 7:
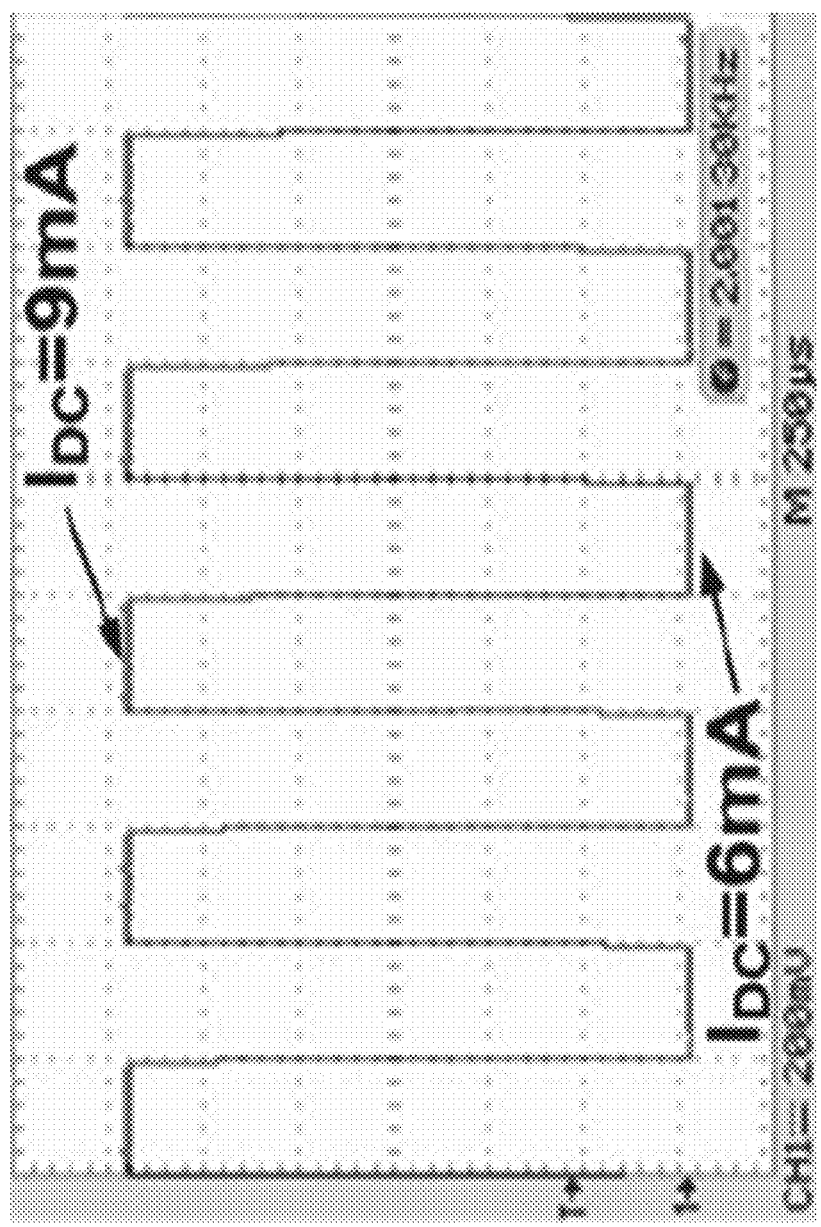
FIG. 7 shows measurement results for another exemplary implementation of the solution presented herein.

FIG. 6 shows simulation results for the scenario where the laser DC bias current for transmission operations is 7 mA, the laser DC bias current for reception operations is 5.1 mA, the slope efficiency (VCSEL) is 0.06 mW/mA, and the photodiode responsivity is 0.16 A/W. For transmission operations, a DC optical power of 0.43 mW generates an output DC bias current of ~70 µA at the output of the photodiode. For reception operations, a DC optical power of 0.31 mW generates a DC bias current of ~50 µA at the output of the photodiode. As shown by the top curve in FIG. 6, the photodiode output current toggles depending on the laser DC bias current, which enables the control signal CTRL output of the detection circuit 260 to toggle accordingly (see bottom curve of FIG. 6). FIG. 7 shows measurement results for another scenario where the laser DC bias current for transmission operations is 9 mA, and the laser DC bias current for reception operations is 6 mA. Thus, as demonstrated by FIGS. 6 and 7, controlling the DC bias used for reception operations relative to the DC bias used for transmission operations represents an effective way to control a switch to selectively connect an antenna port 212 to either a transmission port 214 or a reception port 216.

The solution presented herein uses an antenna switch 210, which may be implemented on-chip, to selectively connect the transmission and reception paths to an antenna 400, which removes the need for a bulky off-chip circulator. Further, because the DC bias current of a transmission signal is used to control the antenna switch 210, the solution presented herein avoids the need for additional optical components (e.g., lasers, photodetectors, fibers, multiplexers, demultiplexers, etc.) in the central node 100 and/or the remote node 200. Thus, the solution presented herein provides a smaller, cheaper, and less complex solution for isolating the transmission and reception chains than typically provided by past solutions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A first network node operatively connected to a second network node via at least one optical fiber, the first network node configured to wirelessly communicate with one or more wireless terminals via an antenna, the first network node comprising:
   a fiber input;
   a fiber output;
   an antenna switch configured to selectively connect an antenna port to either a transmission port or a reception port, the transmission port operatively connecting to the fiber input via a transmission circuit path, the reception port operatively connecting to the fiber output via a reception circuit path, and the antenna port operatively connecting to the antenna; and
   a detection circuit configured to:
      detect a direct current (DC) level of a transmission signal output by the fiber input;
      control the antenna switch to connect the antenna port to the reception port when the detected DC level satisfies a predetermined condition; and
      otherwise, control the antenna switch to connect the antenna port to the transmission port to transmit the transmission signal via the antenna;
   wherein the detection circuit comprises:
      a DC extraction circuit configured to extract the DC level from the transmission signal; and
      a comparator configured to compare the extracted DC level to a reference level to determine whether the detected DC level satisfies the predetermined condition; and
      a reference circuit configured to set the reference level relative to an optimal DC level and responsive to an effective impedance of the transmission circuit path, wherein the optimal DC level comprises a DC bias value selected to optimize a quality of the transmission signal.

2. The first network node of claim 1 wherein the detection circuit is further configured to deactivate one or more circuits of the transmission circuit path when the detected DC level satisfies the predetermined condition.

3. The first network node of claim 1 wherein the predetermined condition is the DC level being less than the reference level.

4. The first network node of claim 1 wherein the predetermined condition is the DC level meeting or exceeding the reference level.

5. The first network node of claim 1 wherein the detection circuit is further configured to deactivate one or more circuits of the reception circuit path when the detected DC level does not satisfy the predetermined condition.

6. The first network node of claim 1 wherein the reference circuit is configured to set the reference level to a value less than the optimal DC level by at least a delta derived from the effective impedance of the transmission circuit path.

7. The first network node of claim 6 wherein the delta is derived from the effective impedance of the transmission circuit path and a maximum amplitude of the transmission signal.

8. A method of controlling an antenna switch in a first network node operatively connected to a second network node via at least one optical fiber and configured to wirelessly communicate with one or more wireless terminals via an antenna, the method comprising:
   receiving an optical transmission signal from the second network node at a fiber input of the first network node;
   converting the received optical transmission signal into an electrical transmission signal;
   detecting a direct current (DC) level of the electrical transmission signal; and
   selectively connecting an antenna port of the antenna switch to a reception port of the antenna switch when the detected DC level satisfies a predetermined condition, the reception port operatively connecting to a fiber output of the first network node via a reception circuit path, and the antenna port operatively connecting to the antenna; and
   otherwise selectively connecting the antenna port to a transmission port of the antenna switch to transmit a radio frequency version of the electrical transmission signal via the antenna, the transmission port operatively connecting to the fiber input of the first network node via a transmission circuit path;
   wherein detecting the DC level of the transmission circuit comprises:
      extracting the DC level from the electrical transmission signal; and
      comparing the extracted DC level to a reference level to determine whether the extracted DC level satisfies the predetermined condition; and
   setting the reference level relative to an optimal DC level and responsive to an effective impedance of the transmission circuit path, wherein the optimal DC level comprises a DC bias value selected to optimize a quality of the optical transmission signal.

9. The method of claim 8 wherein the predetermined condition is the DC level being less than the reference level.

10. The method of claim 8 wherein the predetermined condition is the DC level meeting or exceeding the reference level.

11. The method of claim 8 wherein setting the reference level comprises setting the reference level to a value less than the optimal DC level by at least a delta derived from the effective impedance of the transmission circuit path.

12. The method of claim 11 wherein the delta is derived from the effective impedance of the transmission circuit path and a maximum amplitude of the electrical transmission signal.

13. The method of claim 8 further comprising deactivating one or more circuits of the transmission circuit path when the detected DC level satisfies the predetermined condition.

14. The method of claim 8 further comprising deactivating one or more circuits of the reception circuit path when the detected DC level does not satisfy the predetermined condition.

15. A computer program product stored in a non-transitory computer readable medium for controlling a processing circuit in a first network node, the first network node operatively connected to a second network node via at least one optical fiber and configured to wirelessly communicate with one or more wireless terminals via an antenna, the computer program product comprising software instructions which, when run on the processing circuit, causes the processing circuit to:

receive an electrical transmission signal from a fiber input of the first network node, the electrical transmission signal representing an optical transmission signal received from the second network node at the fiber input of the first network node;

detect a direct current (DC) level of the electrical transmission signal;

selectively control an antenna port of an antenna switch to connect a reception port of the antenna switch when the detected DC level satisfies a predetermined condition, the reception port operatively connecting to a fiber output of the first network node via a reception circuit path, and the antenna port operatively connecting to the antenna; and otherwise, selectively control the antenna port to connect a transmission port of the antenna switch to transmit a radio frequency version of the electrical transmission signal via the antenna, the transmission port operatively connecting to the fiber input of the first network node via a transmission circuit path;

wherein the DC level of the electrical transmission signal is detected by:

extracting the DC level from the electrical transmission signal; and comparing the extracted DC level to a reference level to determine whether the extracted DC level satisfies the predetermined condition; and set the reference level relative to an optimal DC level and responsive to an effective impedance of the transmission circuit path, wherein the optimal DC level comprises a DC bias value selected to optimize a quality of the optical transmission signal.

* * * * *